INVENTOR.
Pieter C.G.M. de Coninck van Noyen

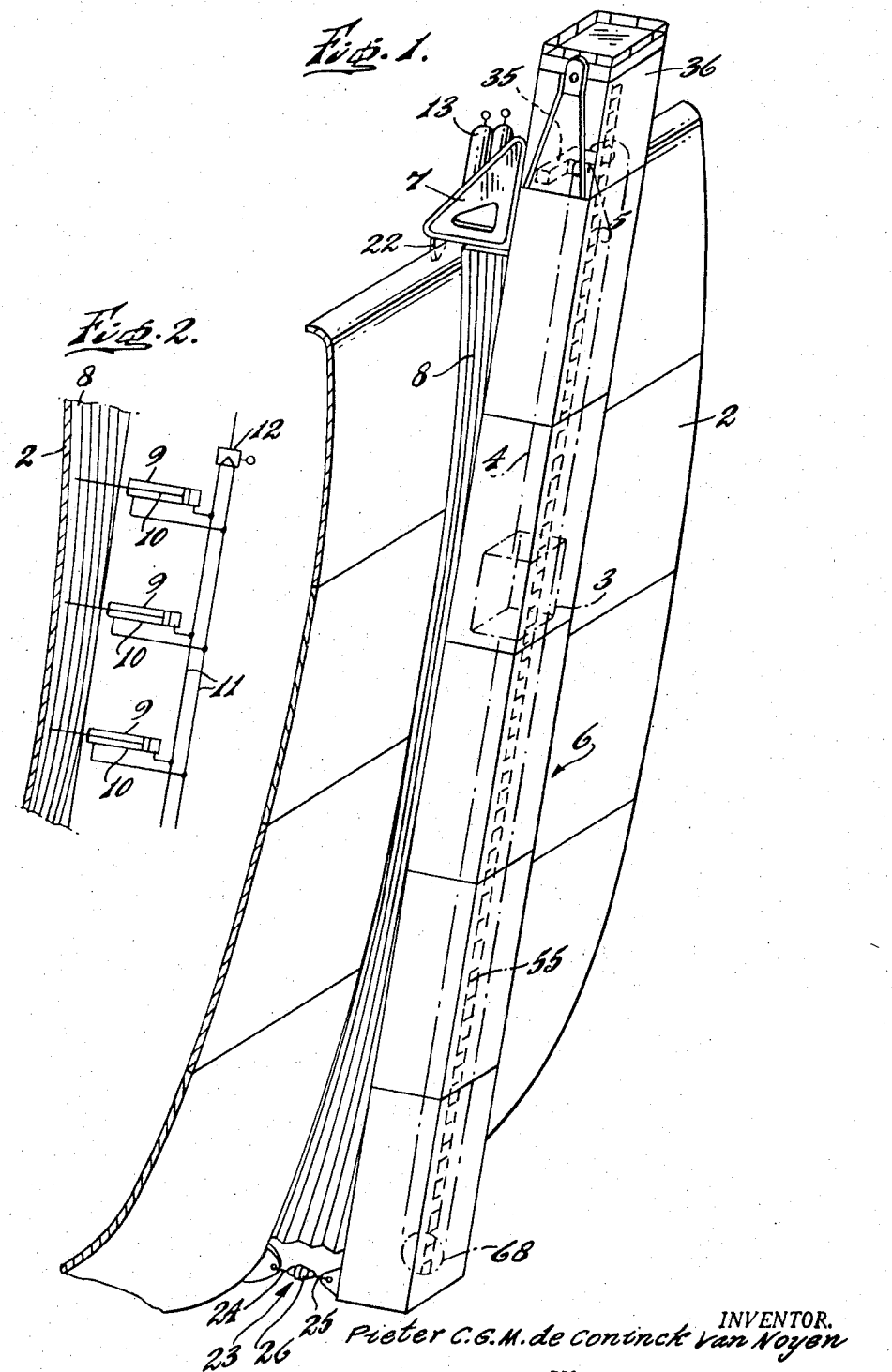

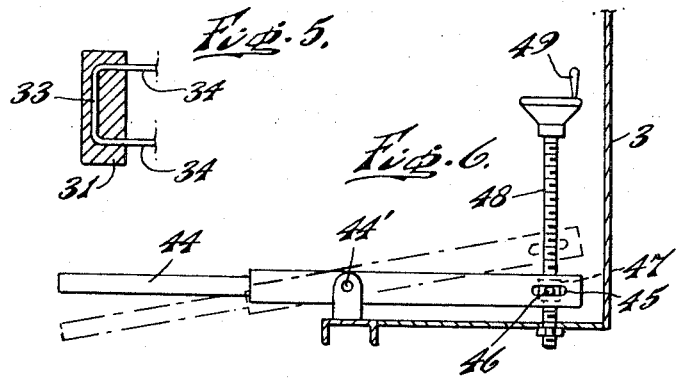
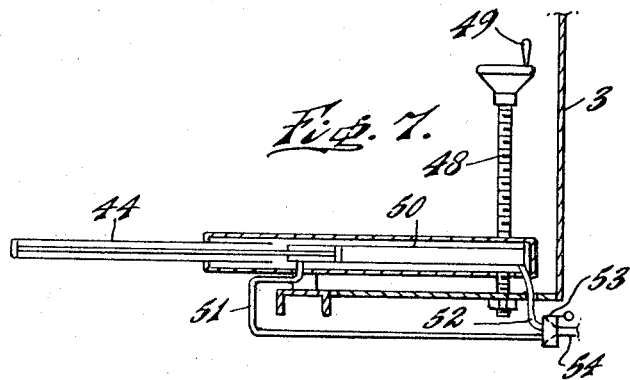
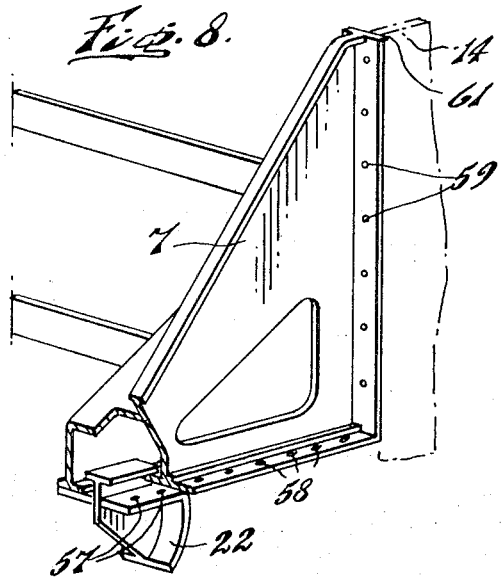

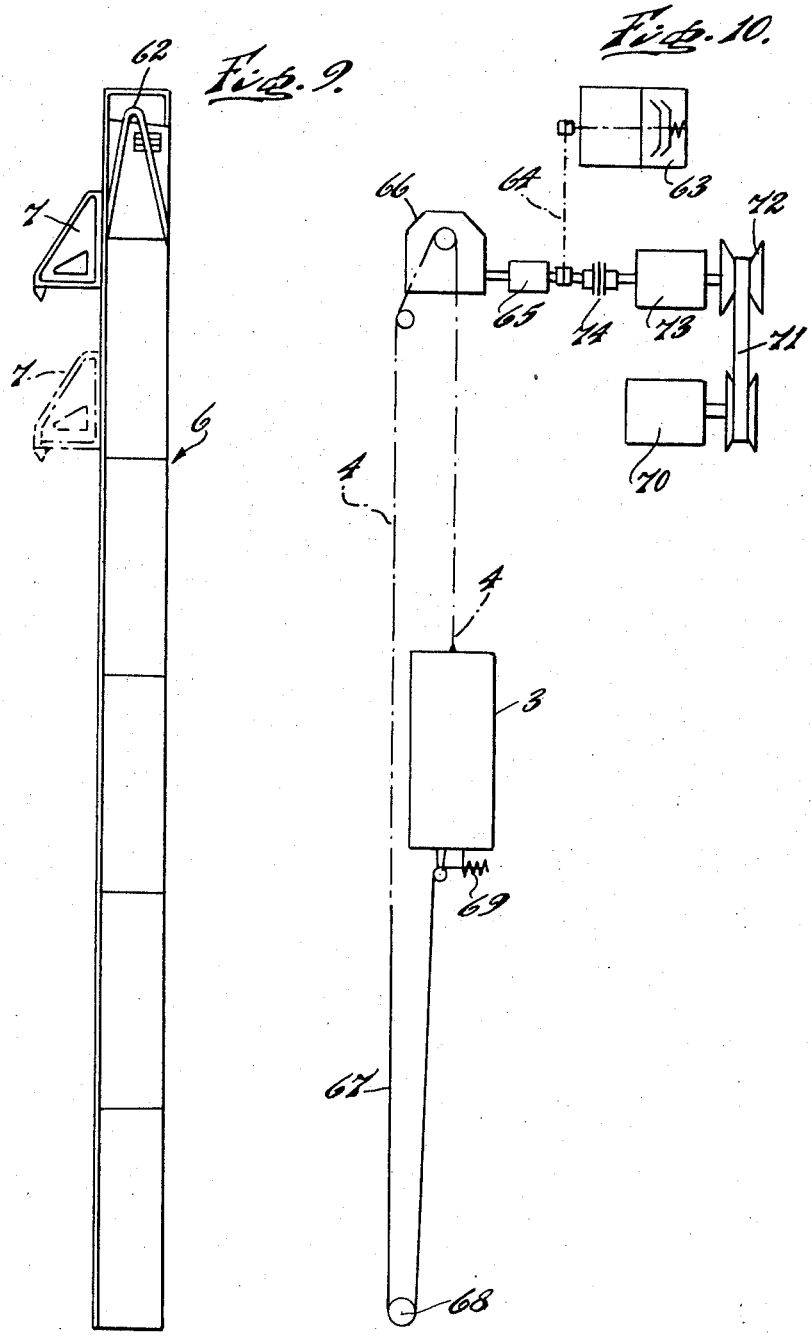

United States Patent Office 3,453,411
Patented July 1, 1969

3,453,411
MACHINE FOR AUTOMATIC WELDING OF RISING JOINTS BETWEEN VERTICAL PLATES
Pieter C. G. M. De Coninck van Noyen, Dilbeek, Belgium, assignor to La Soudure Electrique Autogene Procedes Arcos, Brussels, Belgium, a corporation of Belgium
Continuation-in-part of application Ser. No. 609,167, Jan. 13, 1967. This application Jan. 17, 1967, Ser. No. 609,961
Claims priority, application France, Jan. 18, 1966, 46,240
Int. Cl. B23k 9/02, 9/12, 29/00
U.S. Cl. 219—126                              12 Claims

ABSTRACT OF THE DISCLOSURE

A machine for the automatic welding of rising joints between vertical plates having vertical curvature which includes a cage for a welder which is suspended on a cable by a winch mounted above the plates. The cage is guided along and within a suspended shaft which extends along the wall to be welded and which includes retractable panels about its periphery which are applied tightly against the plate walls by hydraulic jacks. The cage is provided with an adjustable floor means for regulation of the slope and length of the floor.

DESCRIPTION OF THE INVENTION

The present application is a continuation-in-part of my copending application Ser. No. 609,167, filed Jan. 13, 1967 for Machine For Automatic Welding of Rising Joints Between Vertical Plates, now abandoned.

The present invention relates to a machine for automatic welding of rising joints between approximately vertical plates which are fitted together, one into the extension of another, to form a wall, and in particular to a machine for welding the plates of a ship. The machine comprises a cage for a welder suspended on a winch which is mounted above the plates, the said cage containing on the one hand a welding head movable with respect to the cage so as to be able to approach or move away from the plates to be welded, the said head being provided with welding shoes or blocks cooled by a liquid and applied against the opposite faces of the plates at the place where the joint is made, and on the other hand, with a device which causes the automatic advancement of a wire used as an electrode after its passage through a straightener placed at the take-off of a spool on which it was wound.

Machines of this type are known in which the said winch is mounted on a platform which can be attached to the bridge of a ship when a crane has put it there at the desired place, at the same time as the cage which is suspended therefrom. Among other things, the said platform carries a motor which, by means of a friction coupling device, is connected to a gear-box having two outlets which actuate two winding drums for two cables by which the cage is suspended. They are slowly actuated by means of the frictional coupling device in order to move the cage upwards during the welding, and more rapidly upwards or downwards when welding is not taking place, after the coupling device has been put in the neutral position. The platform also carries various other apparatus, amongst which is the pump which ensures the cooling of the blocks during the welding, and apparatus for cooling the cooling water.

With these machines, the cage is suspended close to the side of the ship so that the cage should roll on this side at its lower end when the side of the ship is vertical or remote from the central longitudinal plane of the ship. It is guided laterally by the engaging of two rollers in the gap between the plates to be welded.

These machines have the disadvantage that when the side of the ship approaches the bottom of the median plane thereof, the cage tends to move away from this side and is only held against the latter by the block applied against the faces of the plates on the side opposite to that on which the welding head is situated. It follows that the force necessary to hold the cage against the plates is sustained by the welding head through an arm carrying this said block. This also undergoes the reaction of the plates on this same block if the cage on the contrary is found facing a part of the ship's side which approaches the height of the median longitudinal plane of the ship. Further, the guiding rollers provided in its top half run the risk of coming out of the gap between the plates and in consequence, of no longer guiding the cage laterally. Lateral guiding of this kind, however, is absolutely necessary when the joint between the plates is not in a vertical plane, for example, because the ship is under construction on an inclined slipway. It must also be noted that in such a case, the guiding rollers provided at the top part of the cage are not very effective in maintaining the cage obliquely according to the inclination of the joint to be welded and that it is the edges of the plates to be welded which have to undergo the relatively slow reaction of the cage, which tends to remain vertically suspended under the action of gravity.

Another type of disadvantage relates to the means of protection of the welding zone against side currents of air. It is known that when two welding cabins are provided so that they roll on the top edge of vertical or approximately vertical plates, on both sides of which they are placed, these cabins have already been equipped laterally with screens which rest against the opposite faces of the plates. The use of screens similar in height to the movable cage is possible. Nevertheless, the adaptation of these screens against the plates during the ascending movement of the cage present difficulties when the wall to be obtained by the welding is not planar. In addition, the sliding of these screens against the plates causes their deterioration.

Machines for the automatic welding of rising joints are also known which comprise a chassis suspended in an analogous manner to the said cage, but not constituting a cage and not allowing a welder to accompany the welding head and the various apparatus analogous to that which was contained in the said cage. This chassis is also provided with a finger engaged in the joint between the plates so as to keep the welding head opposite this joint. In addition, on the side of the plates opposed to that where the welding head is found this chassis carried a wall kept opposite the joint so as to protect the welding place against external currents of air meeting the plates. This wall, however, does not prevent the air which circulates along the plates from reaching the welding place.

These machines have the drawback of not allowing the welder to constantly supervise the welding operation and of not ensuring a suitable protection of the welding place against currents of air. Further, keeping the chassis against the plates to be welded equally depends on the action exerted on the block situated at the side of the plates opposed to that whereby the welding head is found.

Machines also exist which comprises a chassis carrying the welding head and various apparatus required to carry out the automatic welding, in which this chassis is guided along a guide held magnetically against the side of the ship. Having regard to the weight of the cage of the suspended type which has been previously mentioned, the magnetic attachment of such a guide would not be sufficient if the cage moved along a part of the ship which differs from the height of the median longitudinal plane of the ship.

The object of the present invention is to remove the drawbacks of the known machines.

The machine according to the invention is characterised in that the two side faces of the said cage are guided in a suspended shaft extending over the whole height of the wall being welded, the said shaft being provided at the side with retractable panels applied tightly against the said wall.

Owing to the fact that the panels mounted on the said shaft are retractable and are not movable in height with the cage, their breadth can easily be modified so that they adapt themselves closely to the shape of the wall to be welded, even when this wall is not planar. The shaft can easily be immobilised with respect to the wall by means of a bracket hung at the top edge of the wall.

In order that the same shaft may be able to serve for the construction of walls of different heights, it is provided with means for fixing the bracket at different levels on the shaft.

According to another advantageous characteristic of the machine according to the invention, the said bracket is provided with a catch for connecting thereto, preferably in a position which can be regulated.

According to another advantageous characteristic of the machine according to the invention, the lower part of the shaft is provided wtih a regulatable device for fixing its length with respect to the wall.

Owing to this device and to the catch for connecting the bracket, the shaft can be inclined so that its foot may be closer to or further away from the central longiudinal plane of a ship than its centre.

In order to facilitate the prolonged stay of the welder in the cage when the shaft is inclined, it is provided with means for regulating the slope of the floor of the cage with respect to the posterior wall thereof. The flooring can thus be kept horizontal with the various inclinations of the shaft as well as in the case when the latter is kept vertical.

In order to take into consideration possible inclinations of the shaft and/or of the more or less curved shape of the side of a ship from top to bottom, it is likewise advantageous to provide a floor of regulatable length for the cage. The front edge of the floor up to the immediate vicinity of the plates which have just been welded can be thus maintained.

Other characteristics and details of the invention will appear during the description of the drawings attached to the present specification, which show diagrammatically, and only by way of example, an embodiment of a machine according to the invention which is suitable for welding the plates forming the side of a ship.

FIGURE 1 is a perspective view of the apparatus according to the invention in the operating position along the side wall of a ship on the stocks, certain parts not having been shown in order to avoid complicating this figure.

FIGURE 2 shows diagrammatically an elevation of the means used to adapt the retractable panels of the machine according to the invention against the metal wall being constructed when this wall is not parallel to the shaft of the machine according to the invention.

Figure 3:
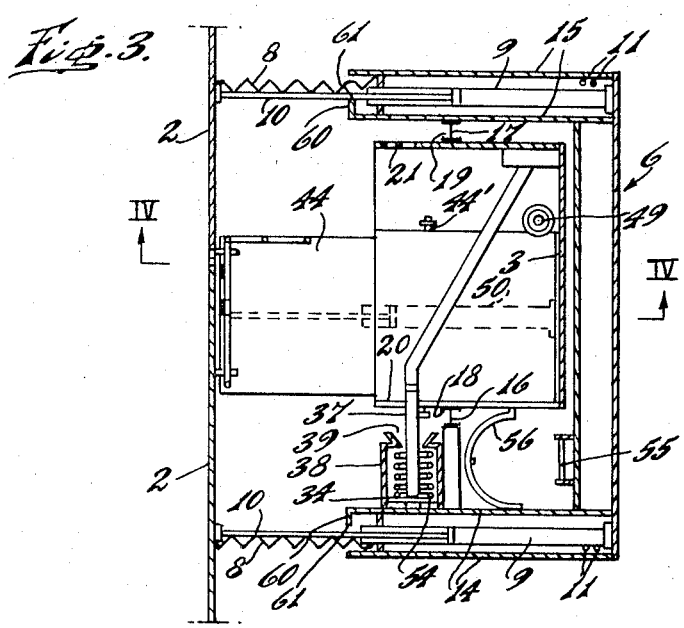
FIGURE 3 is a horizontal section, on a larger scale, of the shaft and the cage of the machine according to the invention, this section being taken at the level of the line III—III in FIGURE 4.

FGURE 4 is a vertical section corresponding to the broken line IV—IV of FIGURE 3.

FIGURE 5 is a vertical section of a welding block according to the invention.

FIGURE 6 represents an elevation of a means which enables the slope of the floor of the cage to be varied with respect to the rear wall of the cage.

FIGURE 7 represents a means for regulating the length of the floor of the cage.

FIGURE 8 is a perspective view of a part of the bracket used for the suspension of the shaft of the machine according to the invention along the side of a ship.

FIGURE 9 represents the bracket for suspending the shaft at two different levels with respect thereto.

FIGURE 10 is a diagram of the elevator device of the machine according to the invention.

In these various figures, the same reference numerals denote the same parts.

In FIGURE 1 there is shown summarily a machine intended for the automatic welding of ascending joints between approximately vertical plates 2 fitted together, one in the extension of the next. These plates are intended to form the wall or hull of a ship. This machine comprises a cage 3 in which a welder can take his place who is supervising the welding operation effected by means of a welding head, of which there will be mention later. The cage 3 is suspended on cables which are indicated in the diagram by a dot-dash line 4. These cables are operated by an elevating device 5 comprising a winch.

The said cage is guided in a suspended shaft 6 which extends for the whole height of the wall to be welded. The suspension of this shaft is effected by means of a bracket 7 connected to the top edge of the side of the ship.

The shaft 6 is provided at the sides with retractable panels 8 applied closely against the said wall.

In order to apply the retractable panels 8 against the wall to be welded when this is not parallel to the shaft 6, these panels are provided in the form of pleated screens which are operated by jacks containing fluid under pressure and distributed over the whole height of the shaft. Jacks of this type are denoted by 9 in FIGURE 2. The rods 10 of the pistons of these jacks are attached to the pleated screens, while the cylinder of the jacks are mounted on the shaft 6. Fixed pipes, such as 11 (FIGURE 2) enable the fluid to be brought under pressure on either face of the jack pistons while the opposite face is under atmospheric pressure. A distributing valve 12 enables either of these pipes 11 to be connected with a reservoir 13 (FIGURE 1) at the same time as the other pipe is connected with the atmosphere. The fixed jacks 9 are attached to the shaft 6 between the partitions 14 and 15 (FIGURE 3) forming the side wall of the said shaft. The inside partition 14 and the inside partition 15 carry guides over the whole height of the shaft and denoted respectively by 16 and 17. These guides engage in U-shaped feet 18 and 19 fixed to the side walls 20 and 21 of the cage. This can then be moved at high or low speed over the whole height of the plates 2 without causing any displacement of the retractable panels 8 in contact with these plates.

The guiding of the cage 3 is suitably ensured over the whole height of the wall, even when the latter is not parallel to the shaft 6 as shown in FIGURE 1. On this figure it is seen that the shaft 6 is held obliquely owing to the fact that the bracket 7 is provided with a connecting catch 22 which prevents this bracket from leaving the top edge of the wall 3, and owing to the fact that the foot of this shaft is provided with a device for fixing it to the wall to be welded 23. This device can be regulated in length. It is composed essentially, as shown diagrammatically, of two rods 24 and 25 threaded in the opposite direction to one another and engaged in a tapped sleeve 26 threaded in a corresponding way. The rotation of this sleeve in one direction or the other enables the foot of the shaft 6 to be brought near to or moved away from the wall of the ship.

Figure 4:
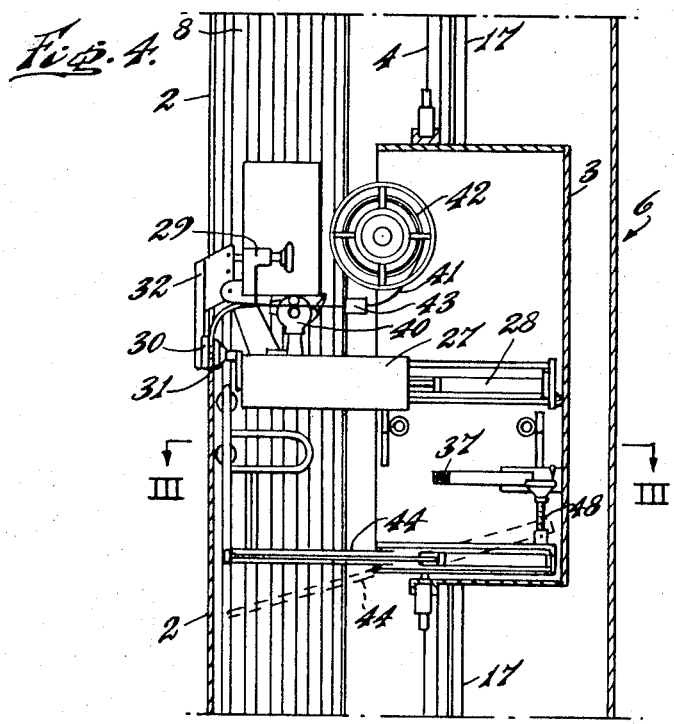

It is seen in FIGURE 4 that the cage 3 has a support 27 which can be brought near to or removed away from the plates 2 by means of a jack 28. The support 27 carries a welding head 29 which is provided with welding blocks 30 and 31 which are movable in height with it. These blocks are kept applied in known manner against the opposite faces of the plates, on both sides of the joint to be made. The block 30 is carried by an arm 32 which passes into the gap between two plates. The blocks 30 and 31 are generally made of copper. They are cooled by the circulation of water.

A section on a larger scale of one of the blocks is shown in FIGURE 5, where it may be seen that the block 31 contains a channel 33 for the circulation of cooling water. This water is passed through flexible pipes 34 connected at the other end to a cooler 35 (FIGURE 1) situated in a chamber 36 also containing the elevating mechanism 5 of the cage. The flexible pipes 34 are suspended at one end from the cooler 35 and at the other end are fixed to an arm 37 (FIGURE 3) carried by the cage. A shaft 38 has at the side a slit 39 for the passage of the said arm, and contains the flexible tubes 34. This shaft extends over the whole height of travel of the cage.

The support 27 also carries a device 40 which effects the automatic advance of a wire 41, used as a welding electrode and coming from a spool 42 carried by the cage. Between the spool 42 and the feed device 40, the wire 41 passes into a straightener 43 also fixed on the support 27. The slope of the floor 44 of the cage can be regulated with respect to the rear wall of the cage so as to permit this floor to remain horizontal when the cage is held by the shaft 6 in a position such as that shown in FIGURE 1. If the floor remained perpendicular to the rear wall of the cage 3, the edge of the floor 44 adjacent to the plates 2 to be welded would be higher than the edge of the floor adjacent to the said rear wall. In order to prevent this drawback, the floor can be made to swing around pivots 44′, only one of which is visible in FIGURE 3, until it is in a position such as that represented by dot-dash lines in FIGURE 4. For this purpose, the said floor has on its side a hole 45 (FIGURE 6) in which a pivot 46 engages. The pivot 46 is carried by a nut 47 engaged on a threaded shaft 48, which the operator can turn by acting on a hand lever 49 when he is in the cage. The said threaded shaft is axially immovable with respect to the cage 3.

The floor 44 can also be regulated in length so that its edge adjacent to the plates can remain applied against these when the cage does not move parallel to these plates. Regulation of the length of the floor 44 is controlled by a hydraulic jack 50, which is connected by means of pipes 51 and 52 and a valve 53 to a flexible tube 54 suspended on an arm 37 in the shaft 38. The shaft also contains electric cables which supply the current to the welding head and flexible tubes which feed fluid under pressure to various appliances carried by the cage 3.

The shaft 6 has a ladder 55 from top to bottom (FIGURES 1 and 3) at the side of the cage 3 in order to allow the welder to reach the cage or to leave it, at whatever height along the wall in construction the cage has stopped. Arches 56 are arranged in the shaft 6 facing the ladder 55 at such a distance therefrom that the operator can easily rest his back there when his feet are on the ladder.

In order to allow a better adaptation of the position of the shaft 6 along the wall to be welded, the position of the connecting catch 22 along the bracket 7 can be adjusted. This connecting catch can be held in different positions by simultaneous engagement of bolts in the holes 57 which it has (FIGURE 8) and in the holes 58 provided in a flange of the bracket.

The bracket 7 can also be regulated in its height along the shaft 6. For this purpose it has holes 59 which can be brought into coincidence with other holes 60, one of which is visible in FIGURE 3, this hole being provided in a flange 61 of the inner partitions 14 and 15. Bolts passing into the holes 59 and 60 enables the bracket 7 to be kept at the desired height with respect to the shaft 6.

FIGURE 9 shows this bracket at two different levels with respect to the shaft 6.

In this figure as well as in FIGURE 1 may be seen one of the catches or lugs 62 at which the suspension cable of the shaft may be attached to the hook of a crane.

In FIGURE 10 is shown an elevating appliance for the cage 3. For movements at high speed of this cage, a braking engine 63 is used which operates, via a chain 64, a torque restrictor 65. This actuates a speed-reducing gear 66, the issuing shaft of which operates chains or cables 4. A chain brace-rod 67 passing over a return pulley 68 is under the action of a spring 69 which is moved with the cage 3.

When it is desired to move the cage much more slowly, for example during the welding, an engine 70 is used which actuates via a trapezoidal belt 71 a speed-varying device with truncated cone discs, the distance of which can be regulated. This speed-varying device operates a speed-reducing gear 73 which, by means of a magnetic coupling 74, is able to operate the entering shaft of the torque restrictor 64. It stands to reason that this restrictor is operated only by the braking engine 63 or by the engine 70.

What I claim is:

1. A machine for the automatic welding of rising joints between approximately vertical plates, which are fitted together, one into the extension of another, to form a wall, having vertical curvature on at least some of the plates, comprising a winch mounted above the plates and have a downwardly extending cable, a cage for a welder which is suspended by the cable having a welding head movable with respect to the cage so as to be able to approach or move away from the plates to be welded, the said head being provided with welding shoes or blocks cooled by a liquid and applied against the opposite faces of the plates at the place where the joint is made, said welding head also including a take-off spool for welding wire, and automatic means for advancing a wire used as an electrode to the joint, said cage having furthermore a vertical shaft extending over the entire height of the wall to be welded, guiding means for the cage guiding on two lateral faces of the vertical shaft, and retractable panels on the shaft applied tightly against the wall.

2. A machine according to claim 1, in combination with a bracket connected to the top edge of the wall and suspending the shaft.

3. A machine according to claim 2, in combination with means for adjusting the height of the bracket along the shaft.

4. A machine according to claim 2, in combination with a connecting catch for the bracket.

5. A machine according to claim 2, in combination with an adjustable connecting catch for the bracket.

6. A machine according to claim 1, in which the shaft includes means at its lower part which can be regulated as to length for attaching the shaft to the wall.

7. A machine according to claim 6, in which the shaft has near its top a chamber containing the winch and cooling means for the welding shoes.

8. A machine according to claim 1, in combination with means in the cage for regulating the slope of its floor with respect to the rear wall and means in the cage for regulating the length of the floor.

9. A machine according to claim 8, in which said means includes a pivot engaging in a hole in the floor, a nut carrying the pivot, a rotatable shaft threaded through the nut and accessible to be turned by the operator in the cage, the rotatable shaft being axially immovable with respect to the cage, and jacks for adjusting the length of the floor.

10. A machine according to claim 1, in combination with jacks distributed along the height of the shaft for controlling the positions of the retractable panels.

11. A machine according to claim 1, in combination with an arm at the side of the cage having electric cables and flexible tubes providing fluid under pressure.

12. A machine according to claim 1, in combination with a shaft surrounding the electric cables and the flexible tubes, and having a slit through which the arm is movable over the distance of movement of the cage.

References Cited
UNITED STATES PATENTS

| | | | |
|---|---|---|---|
| 1,749,765 | 3/1930 | Hendrickson | 219—74 |
| 2,737,565 | 3/1956 | Meyer | 219—126 |
| 2,969,454 | 1/1961 | Lucey | 219—126 |
| 2,997,571 | 8/1961 | Smout | 219—126 |
| 3,134,014 | 5/1964 | Shupp | 219—126 |
| 3,164,714 | 1/1965 | Swan et al. | 219—126 |
| 3,219,792 | 11/1965 | Pederson | 219—121 |
| 3,255,944 | 6/1966 | Yadron et al. | 219—126 |
| 3,382,344 | 5/1968 | Hasegawa et al. | 219—126 |

ANTHONY BARTIS, *Primary Examiner.*

W. D. BROOKS, *Assistant Examiner.*

U.S. Cl. X.R.

219—60, 137